(12) United States Patent
Ashcraft et al.

(10) Patent No.: US 7,877,482 B1
(45) Date of Patent: Jan. 25, 2011

(54) EFFICIENT APPLICATION HOSTING IN A DISTRIBUTED APPLICATION EXECUTION SYSTEM

(75) Inventors: Kenneth Ashcraft, Palo Alto, CA (US); Jon P. McAlister, Millbrae, CA (US); Kevin A. Gibbs, San Francisco, CA (US); Ryan Barrett, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 376 days.

(21) Appl. No.: 12/060,798

(22) Filed: Apr. 1, 2008

(51) Int. Cl.
 G06F 15/173 (2006.01)
 G06F 9/00 (2006.01)
 H04L 9/32 (2006.01)
(52) U.S. Cl. .............................. 709/226; 713/1; 713/176
(58) Field of Classification Search ................ 709/226
 See application file for complete search history.

(56) References Cited

U.S. PATENT DOCUMENTS

| | | | |
|---|---|---|---|
| 7,539,631 B1 * | 5/2009 | El-Haj | 705/26 |
| 7,634,646 B2 * | 12/2009 | Fujimori et al. | 713/1 |
| 7,669,026 B2 * | 2/2010 | Boss et al. | 711/165 |
| 2002/0055984 A1 * | 5/2002 | Chang et al. | 709/217 |
| 2003/0217077 A1 * | 11/2003 | Schwartz et al. | 707/200 |
| 2004/0003347 A1 * | 1/2004 | Saidenberg et al. | 715/511 |
| 2004/0193574 A1 * | 9/2004 | Suzuki | 707/2 |
| 2005/0015804 A1 * | 1/2005 | LaJoie et al. | 725/44 |
| 2005/0097132 A1 * | 5/2005 | Cochran et al. | 707/104.1 |
| 2005/0179918 A1 * | 8/2005 | Kurumisawa et al. | 358/1.9 |
| 2006/0075101 A1 * | 4/2006 | Anerousis et al. | 709/225 |
| 2007/0112785 A1 * | 5/2007 | Murphy et al. | 707/10 |
| 2008/0082955 A1 | 4/2008 | Andreessen et al. | 717/100 |
| 2008/0091902 A1 * | 4/2008 | Lee | 711/165 |
| 2008/0307438 A1 * | 12/2008 | Creamer et al. | 719/318 |
| 2009/0106424 A1 * | 4/2009 | Safari et al. | 709/226 |
| 2009/0117889 A1 * | 5/2009 | Varanda | 455/418 |
| 2010/0043016 A1 * | 2/2010 | Anzai | 719/320 |
| 2010/0114705 A1 * | 5/2010 | Hoyle | 705/14.54 |

* cited by examiner

*Primary Examiner*—Hassan Phillips
*Assistant Examiner*—James Edwards
(74) *Attorney, Agent, or Firm*—Morgan, Lewis & Bockius LLP

(57) ABSTRACT

In a distributed application execution system having an application master and a plurality of application servers, each application server includes one or more processors and memory storing one or more programs. The one of more programs include instructions for storing in non-volatile storage a plurality of applications distributed to the application server by the application master, for loading into volatile storage and executing a respective application in response to a received request, and for returning a result to the request. In addition, the one of more programs include instructions for conditionally retaining the respective application in volatile storage, for responding to a future request, when criteria, including at least predefined usage level criteria, are met by the respective application, and otherwise removing the respective application from volatile storage upon returning the result to the request.

40 Claims, 13 Drawing Sheets

EFFICIENT APPLICATION HOSTING IN A DISTRIBUTED APPLICATION EXECUTION SYSTEM

TECHNICAL FIELD

The disclosed embodiments relate generally to methods and systems, sometimes called application servers, for hosting and executing large numbers of heterogeneous applications.

BACKGROUND

In general, increases in an application's popularity could present a variety of scalability problems that negatively impact a user's experience. For example, users could experience slower response times, slower page loading, and increased time outs on page requests. These scalability problems are typically alleviated by allocating additional capacity to the application such as more storage, more memory, more CPUs, and more machines in general.

Allocating or installing more computing capacity may be a reasonable solution when increases in an application's popularity are experienced over a prolonged period of time, or when usage of the application is predictable. Similarly, when an application experiences a decrease in usage, removing computing capacity previously allocated to the application may be a reasonable solution, especially when the is experienced over a prolonged period of time, or when the decrease is predictable. However, the popularity of an application is often unpredictable, due to a variety of factors (e.g., time of day, current events, advertising, trends), and fluctuates to a large extent, which creates load spikes and dips in the application execution or hosting system.

Predefined allocations of computing resources are inefficient solutions for handling temporary load spikes and dips. Increasing or installing more computing resources to handle a load spike is inefficient, since the additional pre-allocated resources go unused when the spike disappears (e.g., when the spike in demand subsides, or the application's popularity dips). Similarly, decreasing computing resources allocated to an application when its popularity declines is also inefficient, since future usage spikes will require the re-allocation of previously removed resources back to the application.

To complicate matters further, application systems may host a large number of heterogeneous applications, each with its own set of fluctuating resource requirements. Pre-allocation of resources, for the reasons discussed above, is often an inefficient solution for ensuring consistent positive user experiences among heterogeneous applications hosted on an application system.

SUMMARY

An application server, for use in a system having an application master and a plurality of application servers, includes one or more processors and memory storing one or more programs to be executed by the one or more processors. The memory includes volatile storage and non-volatile storage. The one of more programs including instructions for storing in the non-volatile storage a plurality of applications distributed to the application server by the application master, for loading into volatile storage and executing a respective application in response to a received request, and for returning a result to the request. In addition, the one or more programs include instructions for conditionally retaining the respective application in volatile storage, for responding to a future request, when criteria, including at least predefined usage level criteria, are met by the respective application, and otherwise removing the respective application from volatile storage upon returning the result to the request.

In another aspect of the invention, a method of operating an application server in a system having a plurality of application servers includes storing in non-volatile storage of the application server a plurality of applications distributed to the application server by an application master, receiving a request from a source external to the application server, and loading into volatile storage and executing a respective application in response to the received request, and returning a result to the request. The method further includes conditionally retaining the respective application in the volatile storage, for responding to a future request, when criteria, including at least predefined usage level criteria, are met by the respective application, and otherwise removing the respective application from volatile storage upon returning the result to the request.

In another aspect of the invention, an application execution system includes a plurality of application servers. Each of the application servers include non-volatile storage for storing a plurality of applications, volatile storage, and computational resources for executing applications in response to requests received by the application execution system. The application execution system also includes an application master that stores a plurality of applications in a library for distribution among the application servers. The application master includes instructions for distributing applications from the library to the application servers for storage in the non-volatile storage of the application servers and monitoring the application servers to generate usage information for each of the applications in the library for a predefined period of time. The application master also includes instructions for removing previously distributed applications from the non-volatile storage of respective application servers in accordance with the usage information. The application master distributes each application to a respective number of the application servers in accordance with the usage information. Each application server includes instructions for storing in non-volatile storage the applications distributed to the application server, loading a respective application into volatile storage, executing the respective application in response to a received request, and returning a result to the request. Each application server further includes instructions for conditionally retaining the respective application in volatile storage, for responding to a future request, when criteria, including at least predefined usage level criteria, are met by the respective application, and otherwise removing the respective application from volatile storage upon returning the result to the request.

In another aspect of the invention, a method of operating a plurality of application servers and an application master in an application execution system includes storing in a library at the application master a plurality of applications for distribution among the application servers. Applications from the library are distributed to the application servers for storage in the non-volatile storage of the application servers. The application master also monitors the application servers to generate usage information for each of the applications in the library for a predefined period of time, and removes previously distributed applications from the non-volatile storage of respective application servers in accordance with the usage information. Each application is distributed to a respective number of the application servers determined by the application master in accordance with the usage information. At each application server, the applications distributed to the application server are stored in non-volatile storage. A respective application is loaded into volatile storage, is executed in response to a received request, and returns a result to the request. The respective application is conditionally retained in volatile storage, for responding to a future request, when criteria, including at least predefined usage level criteria, are met by the respective application, and otherwise removed from volatile storage upon returning the result to the request.

BRIEF DESCRIPTION OF THE DRAWINGS

Like reference numerals refer to corresponding parts throughout the several views of the drawings.

DESCRIPTION OF EMBODIMENTS

Figure 1:
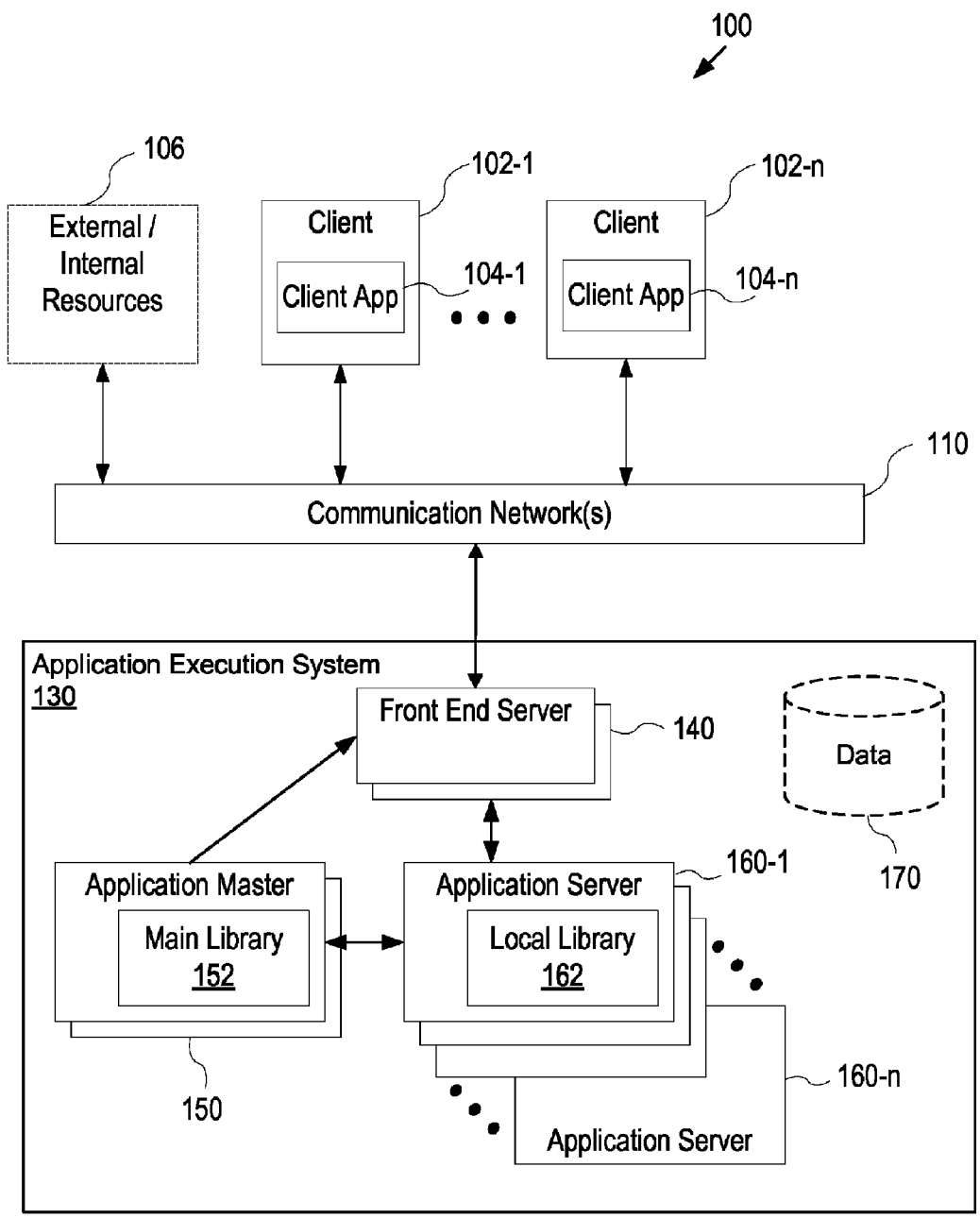
FIG. 1 is a block diagram of a distributed computing system including an application execution system according to certain embodiments of the invention.

FIG. 1 is a block diagram of a distributed computing system 100 including an application execution system 130 connected to a plurality of clients 102 (e.g. 102-1 ... 102-n) through a network 110 such as the Internet, other wide area networks, local area networks, metropolitan area networks, wireless networks, or any combination of such networks. In some embodiments, a respective client 102 contains one or more client applications 104 (e.g. 104-1 ... 104-n), such as a web browser, for submitting application execution requests to the application execution system 130. The client 102 (sometimes called the "client device" or "client computer") may be any computer or similar device through which a user of the client 102 can submit requests to and receive results or services from the application execution system 130. Examples include, without limitation, desktop computers, notebook computers, tablet computers, mobile devices such as mobile phones, personal digital assistants, set-top boxes, or any combination of the above.

In some embodiments, the application execution system 130 include a front-end server 140, which receives application execution requests from clients 102 and returns results to the requesting clients.

The application execution system 130 include a plurality of application servers 160 (e.g., 160-1 through 160-n). As described in more detail below with reference to FIG. 2B, each of the application servers 160 includes non-volatile storage for storing a plurality of applications in a local library 162, volatile storage, and computational resources for executing applications in response to requests received by the application execution system 130.

As described in more detail below with reference to FIGS. 2A and 2B, the application execution system 130 also includes an application master 150 that distributes applications, from a main library 152 having a plurality of applications, among the application servers 160. In the embodiment shown in FIG. 1, the main library 152 is stored in the application master 150. Alternately, the main library 152 may be stored remotely from the application master, such as in a data store 170. In some embodiments, each application of the plurality of applications in the main library 152 is a web application that is responsive to HTTP requests. However, the present invention can also be used in non-web based environments, in which case the applications need not be web-based applications.

In some embodiments, the application execution system 130 may also include a data store 170 accessible to at least the application master 150 and the front-end server 140, for sharing information about the location of applications among the application servers 160 and resource usage or loading information with respect to the application servers 160.

Optionally, the distributed system 100 includes additional resources 106, which may be located either internally or externally to the system 100, for use when executing applications in the application execution system 130. For example, an application executed by the application execution system 130 may access information in one or more of the additional resources 106 in order to process a request received from a respective client 102.

Figure 2A:
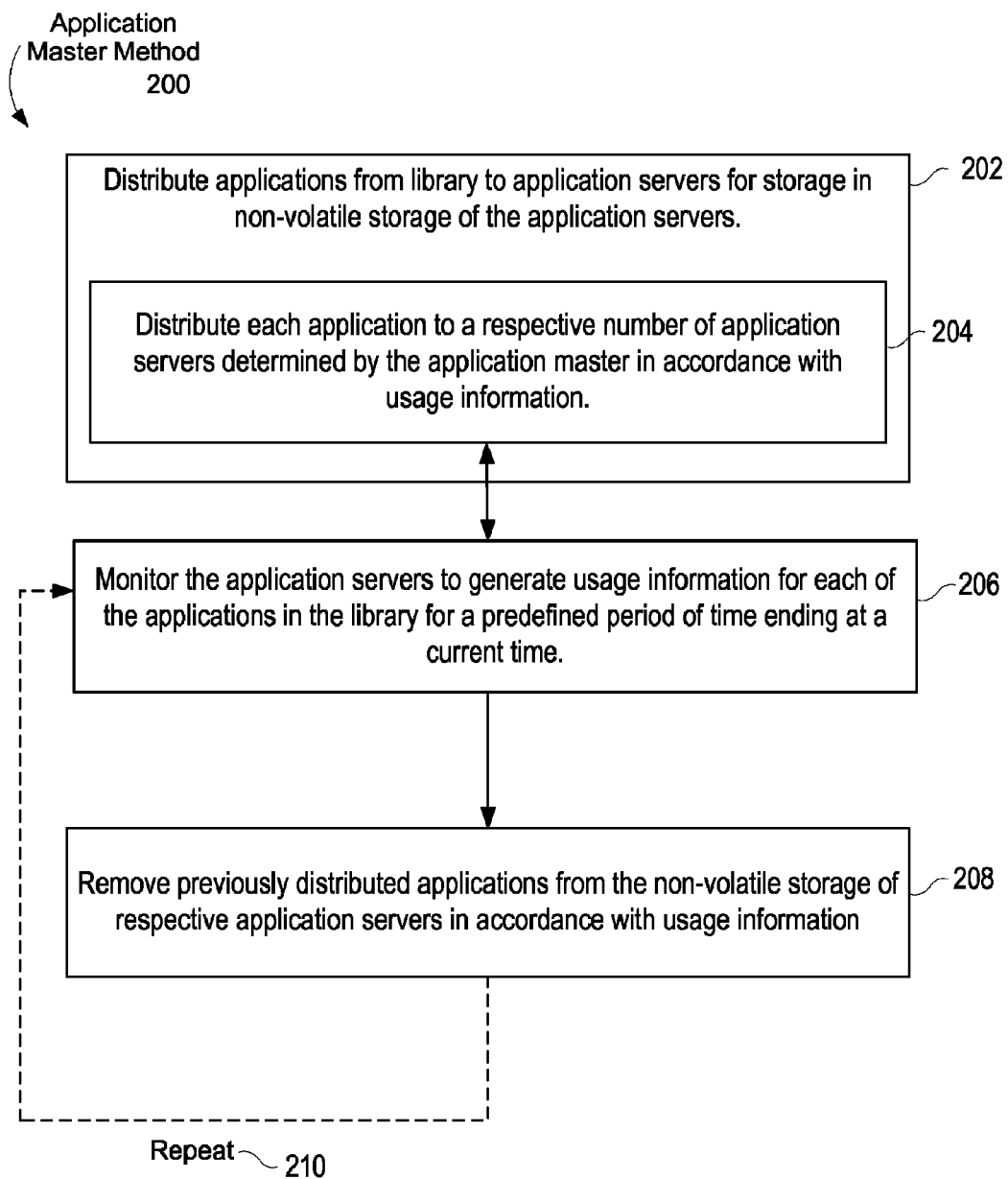
FIG. 2A is a flow diagram illustrating an exemplary method performed by an application master according to certain embodiments of the invention.

FIG. 2A is a flow diagram illustrating a method 200 performed by an application master according to certain embodiments of the invention. The application master distributes (202) applications from the main library 152 (FIG. 1) to the application servers 160 for storage in the non-volatile storage (i.e., local library 162) of the application servers 160. As described in more detail below with reference to FIG. 2B, each application from the library is distributed by the application master 150 to a respective number of the application servers 160 that is determined by the application master in accordance with usage information for the application (204). Thus, applications in heavy use are typically distributed to more application servers than applications receiving less use. The method 200 further includes monitoring (206) the application servers 160 to generate usage information for each of the applications in the library for a predefined period of time ending at a current time, and removing (208) previously distributed applications from the non-volatile storage of respective application servers 160 in accordance with the usage information. Typically, the distributing, monitoring and removing operations are repeated 210, or are ongoing, so long as the system continues to operate.

Figure 2B:
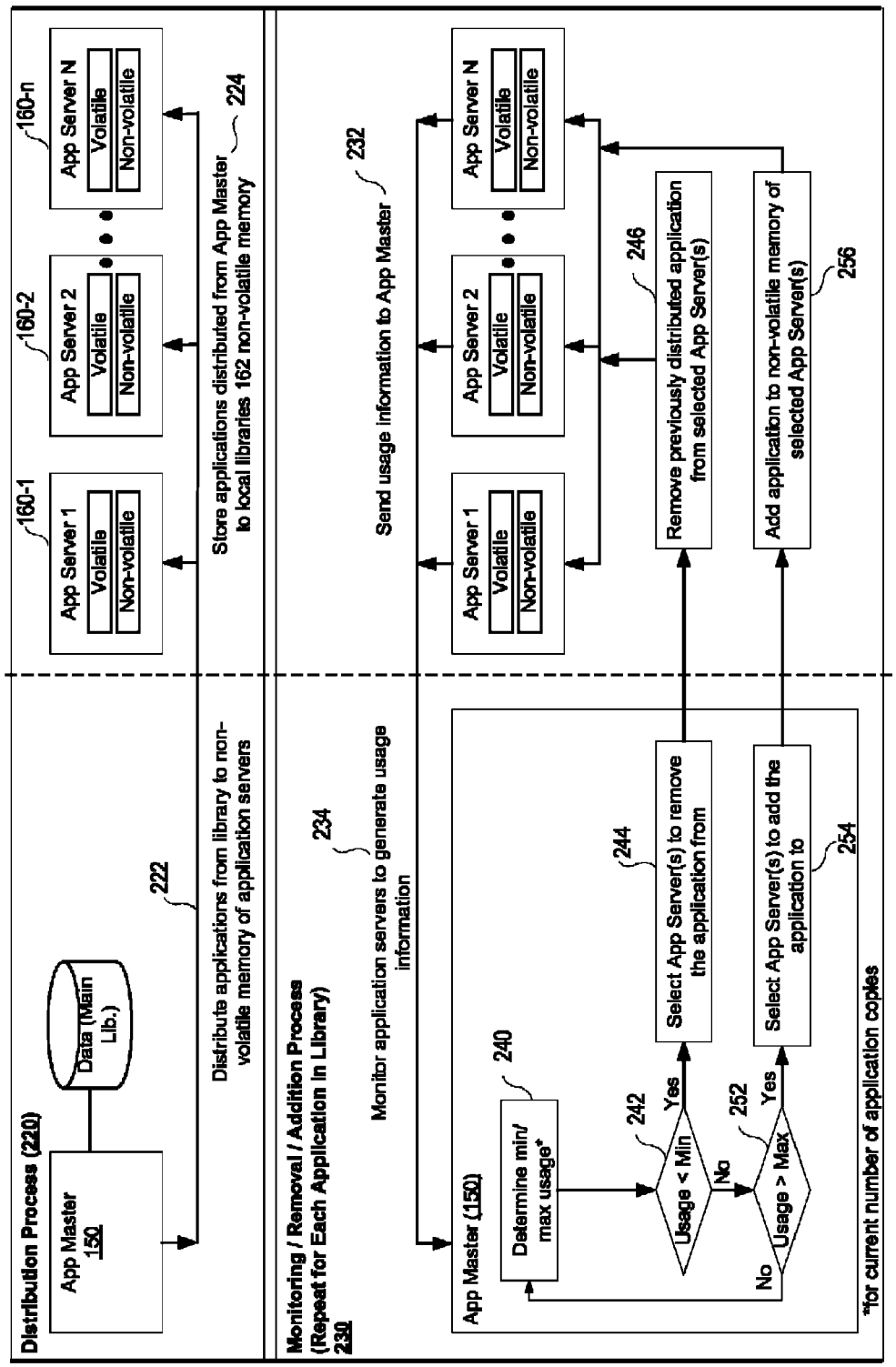
FIG. 2B is a flow diagram illustrating examples of distribution, monitoring, removal, and addition processes according to certain embodiments of the invention.

FIG. 2B is a more detailed flowchart of a method 200 described above with reference to FIG. 2A. The top portion of FIG. 2B is a schematic view of a distribution process 220 in which the application master 150 distributes (222) applications from the main library 152 to application servers 160 for storage in non-volatile storage. Each of the application servers 160 stores (224) in its non-volatile storage the applications distributed to it by the application master. In some embodiments, the application master 150 distributes each application in the main library 152 to at least three of the application servers 160. The minimum number of application servers to which each application is distributed is selected in order to ensure at least a predefined minimum level of service for every application in the main library.

The application servers send (232) application usage information to the application master, and the application master monitors (234) the application servers to generate usage information for each of the applications in the library for a predefined period of time. From the generated usage information, the application master 150 can evaluate usage of each application (e.g., frequency of usage, resources used, etc.), and can also evaluate the loading of each application server. In some embodiments, the usage information (e.g., CPU usage information 352, FIG. 3B) and information about the amount of storage available at a respective application server (e.g., server storage data 356, FIG. 3B) used by the application master to determine the load on an application server are stored in a data structure 340, described below with reference to FIG. 3B. Information about the CPU usage of a respective application (e.g., CPU usage 326, FIG. 3A), used by the application master to determine the usage level of the application, is stored in a data structure 300, described below with reference to FIG. 3A.

As described in more detail below, the application master 150 evaluates the usage information according to pre-defined criteria, and takes appropriate action by increasing or decreasing the number of application servers to which each application has been distributed, to ensure that sufficient resources are available to service client requests for execution of the applications. In some embodiments, the application distribution process by the application master, as applied to each application in the library, includes evaluating usage level thresholds for the application based on the number of active application servers to which the application has been distributed. For example, minimum and maximum thresholds are determined, which indicate a suitable range of application usage (over a predefined period of time) for the number of application servers on which the application is stored. If the usage level is below the minimum usage threshold (242—Yes), the application master 150 removes the application from a selected set of the application servers (244). Upon receiving application removal instructions from the application master, the selected application servers remove the application from their non-volatile storage (246).

If the usage level is above the maximum threshold (252—Yes), the application master 150 distributes (254) additional copies of the application from the main library to a selected set of the application servers. The selected application servers store (256) the application in their local libraries 162 (FIG. 1) in non-volatile memory. In some embodiments, while performing operations 244 and 254 the application master manages the load on a respective application server, in accordance with predefined load distribution criteria, by distributing applications to and removing applications from the non-volatile storage of the respective application server. More generally, the application master takes into account the current application execution loads on the application servers when determining the applications servers to send additional applications and the applications servers from which to remove applications.

Occasionally, application server(s) may need to be removed (or taken offline) from a cluster for repairs, routine maintenance, and other reasons. In these situations, the application master 150 may transfer load handled by the application server(s) to be removed and redistribute this load across remaining active application servers. The process of transferring load to the active servers may be rate-limited so that application servers can be safely removed after a period of time without disrupting the system.

In some embodiments, the removing of previously distributed applications from the non-volatile storage of the application servers and the distributing of applications from the library to the application servers are rate limited with respect to how many applications are removed and distributed per predefined period of time. A rate limit (e.g., a limit of N applications per unit of time) may be applied to each application server individually, or to a cluster or other group of application servers. In some embodiments, the rate limit is set small enough so that changes in the load pattern of an application server occur slowly, rather than all at once, which allows the application master to make other changes to account for the load. The load increase that will be caused by adding a new application to a server is unknown. It may cause a large increase in load on the server, or it may have no effect. By rate limiting how many applications are added (or removed) from an application server, the system is given more time to adjust to changes in loads caused by the additions or removals.

Figure 3A:
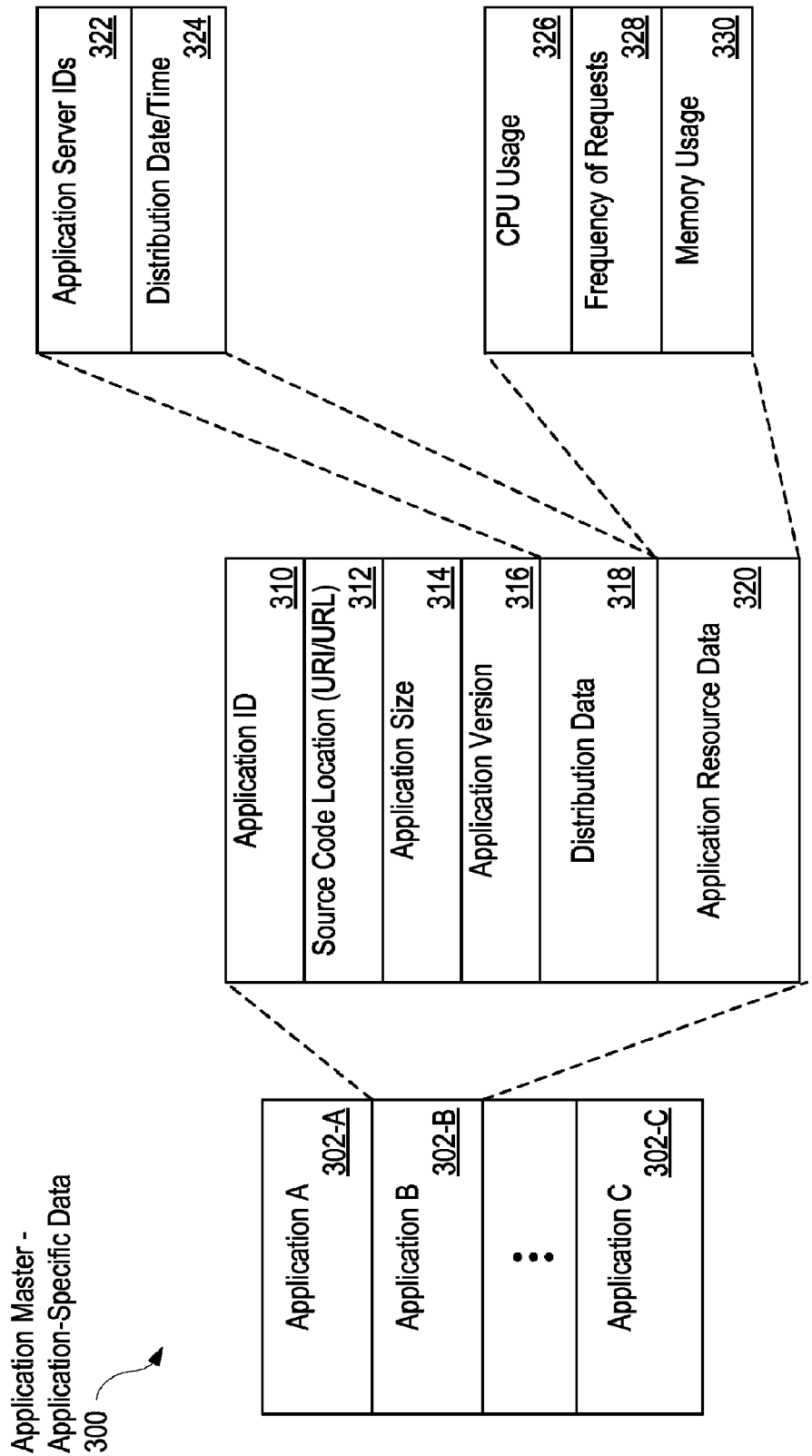
FIG. 3A represents a data structure used by an application master to store information regarding a set of applications that have been distributed to a set of application servers in accordance with some embodiments of the invention.
Figure 3B:
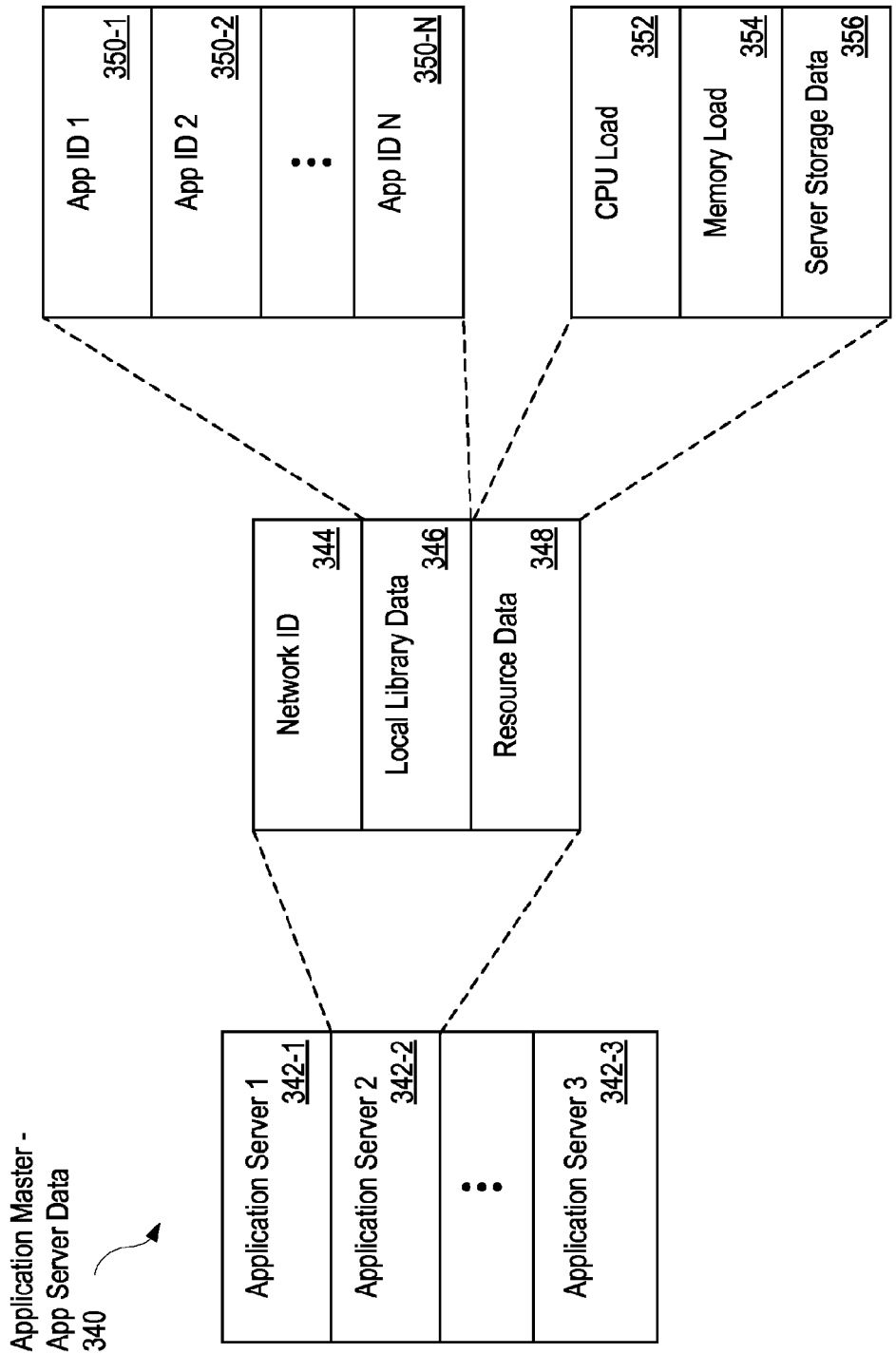
FIG. 3B illustrates a data structure used by an application master to store information concerning a set of application servers to which a set of applications have been distributed in accordance with some embodiments of the invention.

FIGS. 3A-3B are examples of data structures that may be used by the application master 150 to monitor resource usage at the application servers 160. FIG. 3A is a block diagram of a table or other data structure 300 storing information about each of the applications in the main library 152. Alternately, the data structure 300 includes information for a subset of the applications, such as active applications that have been distributed to application servers. The data structure 300 includes a respective record 302 for each application for which information is stored. In some embodiments, the record 302 is maintained by the application master 150 and stores the information specific to the application (e.g., record 302-B for Application B) including:

- a unique application identifier (application ID) 310;
- the location of the application's source code (Source Code Location) 312;
- the storage size of the application 314;
- a version identifier for the application 316;
- distribution data 318 identifying application servers that have a copy of the application in their local libraries; and
- application resource data 320, which includes information about the resources consumed by the application.

In some embodiments, the distribution data 318 includes:
- information identifying the application servers that contain the respective application (e.g., Application Server IDs) 322; and
- optionally, dates and times showing when the respective application was distributed to the identified application servers (Distribution Date/Time) 324.

In some embodiments, the application resource data 320 for a particular application includes one or more of the following fields: CPU usage information 326, indicating an amount of CPU usage over a predefined period of time, or per execution, or other statistics (e.g., minimum, maximum, average, mean, standard deviation) relating to CPU usage by the application; frequency of requests 328, indicating a number of executions of the application per predefined period of time, or other statistics relating to the frequency of requests for the application; and memory usage 330, indicating the amount of memory used during execution of the application, or other statistics relating to memory usage by the application. It is noted that the fields of the data structure 300 described above are examples of information stored by the application master. In other embodiments, the application master 150 may store a subset of these fields, and may optionally store additional information about the applications in the master library 152. Furthermore, the information represented here as being stored in data structure 300 may be organized in other ways, for example divided over multiple data structures, in other embodiments of the invention.

FIG. 3B is a block diagram of a table or other data structure 340 storing information about each of the application servers 160 in the application execution system 130. Alternately, the data structure 340 includes information for a subset of the application servers, such as active application servers serviced by the application master. The data structure 340 includes a respective record 342 for each application server for which information is stored. In some embodiments, the record 342 is maintained by the application master 150 and stores the information specific to the application server (e.g., record 342-2 for Application Server 2), including:

- a unique identifier 344 (e.g., network ID) for the application server, for example an identifier that indicates or that can be used to find the server's location on the network;
- local library data 346 identifying the specific applications installed on the application server's local library; and
- resource data 348 indicating the amount of resources used by the application.

The local library data 346 includes information (e.g., application identifiers 350) identifying the applications installed on the application server. Optionally, local library data 346 includes additional information, such as distribution date information or version information for the listed applications. The information in the local library data 346 for a respective application server is received from that application server, and may be stored at the application server either as a distinct data structure, or together with the local application library itself, or in combination with other information retained by the application server.

The resource data 348 may include information on the CPU load 352 of the application server (e.g., statistics, such as average, mean, minimum, maximum, standard deviation, etc.) over a predefined period of time, memory load 354 of the application server (e.g., statistics of volatile memory usage over a redefined period) from which the application master can determine the amount of memory used and available on the application server, and server storage data 356 (e.g., non-volatile storage available, storage used, etc.) from which the application master can determine the amount of non-volatile storage available on the application server. It is noted that the fields of the data structure 340 described above are examples of information stored by the application master. In other embodiments, the application master may store a subset of these fields, and may optionally store additional information about the application servers in the application execution system 130. Furthermore, the information represented here as being stored in data structure 340 may be organized in other ways, for example divided over multiple data structures, in other embodiments of the invention.

Figure 3C:
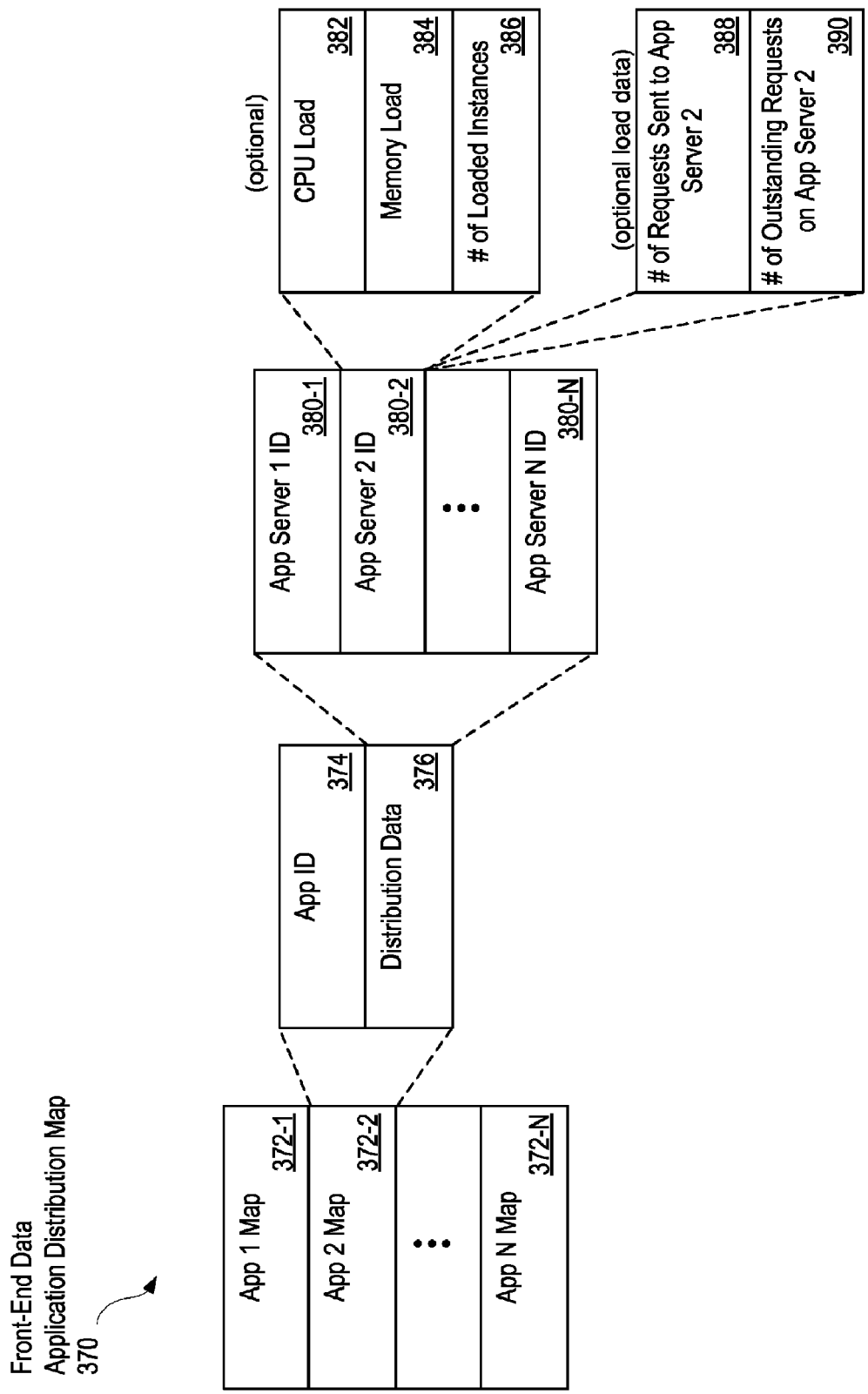
FIG. 3C illustrates a data structure used by a front-end server to route application processing requests to application servers in accordance with some embodiments of the invention.

FIG. 3C is a block diagram of a table or other data structure 370 used by a front-end server 140 to route application processing requests to application servers 160. In accordance with some embodiments, the application master 150 (FIG. 1) generates distribution data identifying which of the applications are present in the non-volatile storage of each of the application servers, and the one or more front-end servers 140 of the application execution system 130 route requests to the application servers in accordance with the distribution data. In some embodiments, the front-end servers 140 route requests to the application servers based on load data collected from the application servers. In the example shown in FIG. 3C, the distribution data, and optionally other information that can be used for determining the application server to which a respective application execution request should be routed, is stored in a data structure 370 such as the one shown in FIG. 3C.

The data structure 370 stores a respective record 372 for each application to which the front-end 140 may need to route application execution requests. This record 372 may be called an application distribution map. In some embodiments, the record 372 for a respective application includes the following information: an identifier 374 of the application, and distribution data 376 for the application. The distribution data 376 includes a list of identifiers 380 or other information identifying the application servers that have a copy of the application in their local libraries. Optionally, the distribution data 376 includes resource information associated with respective application at each of the identified application servers, such as one or more of: CPU load information 382, memory load information 384, and the number of loaded instances 386 of the application at the respective application server (the loading of application instances in volatile memory is described in more detail below). It is noted that the fields of the data structure 370 described above are examples of information stored by the application master. In other embodiments, the application master 150 may store a subset of these fields, and may optionally store additional information about the distribution of applications in the application execution system 130. Furthermore, the information represented here as being stored in data structure 370 may be organized in other ways, for example divided over multiple data structures, in other embodiments of the invention. Two examples of additional information that may optionally be included in the resource data 370 (or 348, FIG. 3B) for a particular application server are: the number of (application execution) requests 388 that have been sent to the application server over a defined period of time (e.g., an hour), and/or the number of outstanding (or queued) requests 390 that are pending at the application server. The resource data 370 (or 348), stored by the front-end for a respective application server may comprise averages or running averages of resource usage by the applications being executed by the respective application server.

The front-end server 140 receives the application distribution map 370 from the application master 150. As noted above, the application distribution map 370 optionally includes resource usage information that can be used to route requests received from client(s) 102. For example, upon receiving a request from a client to execute a specified application, the front-end server 140 accesses the corresponding record 372 (of application distribution map 370) for the specified application to determine the application servers that have copies of the application. In some embodiments, the front-end server 140 routes such requests using a round robin methodology (e.g., in round robin order within the list of application servers in the record 372 for the application), or a random assignment methodology (e.g., randomly or pseudo-randomly among the application servers listed in record 372).

In some other embodiments, the front-end server 140 routes requests based on current and historical load information that the front end server has observed directly. Two load metrics that the front-end server 140 can observe directly are the number of application execution requests that the front-end server 140 has recently sent to each application server, and the number of currently outstanding application execution requests at each application server (e.g., the number of recent application execution requests sent to each application server which have yet to return results or a signal of completion). It is noted that the number of pending application execution requests (also called currently outstanding application execution requests) is a latency metric, and thus measures performance from the perspective of the system's users. Using this information, which may be observed and stored by the front-end server 140, the front end server 140 may route application requests. For example, the front-end server 140 may route a request to the application server that (A) has a copy of the requested application, and (B) the least number of outstanding requests. In another example, the front-end server 140 may route a request to the application server that (A) has a copy of the requested application, and (B) the least number of outstanding requests for the requested application.

Alternately, the front end server 140 accesses resource information associated with the application servers that have copies of the application, and uses that information to route the request. For example, the front end server 140 may select an application server have the lowest load (e.g., CPU load, memory load, or a predefined combination thereof), or a load below a predefined threshold. Alternately, the front end server 140 may take into account the number of instances of the application already loaded in the volatile memory of each of the listed application servers, and may favor sending the request to an application server having one or more loaded instances of the application so long as predefined the server also meets predefined load criteria (e.g., a load level below a threshold, a load lower than other application servers having one or more loaded instances of the application, or the like).

Figure 4A:
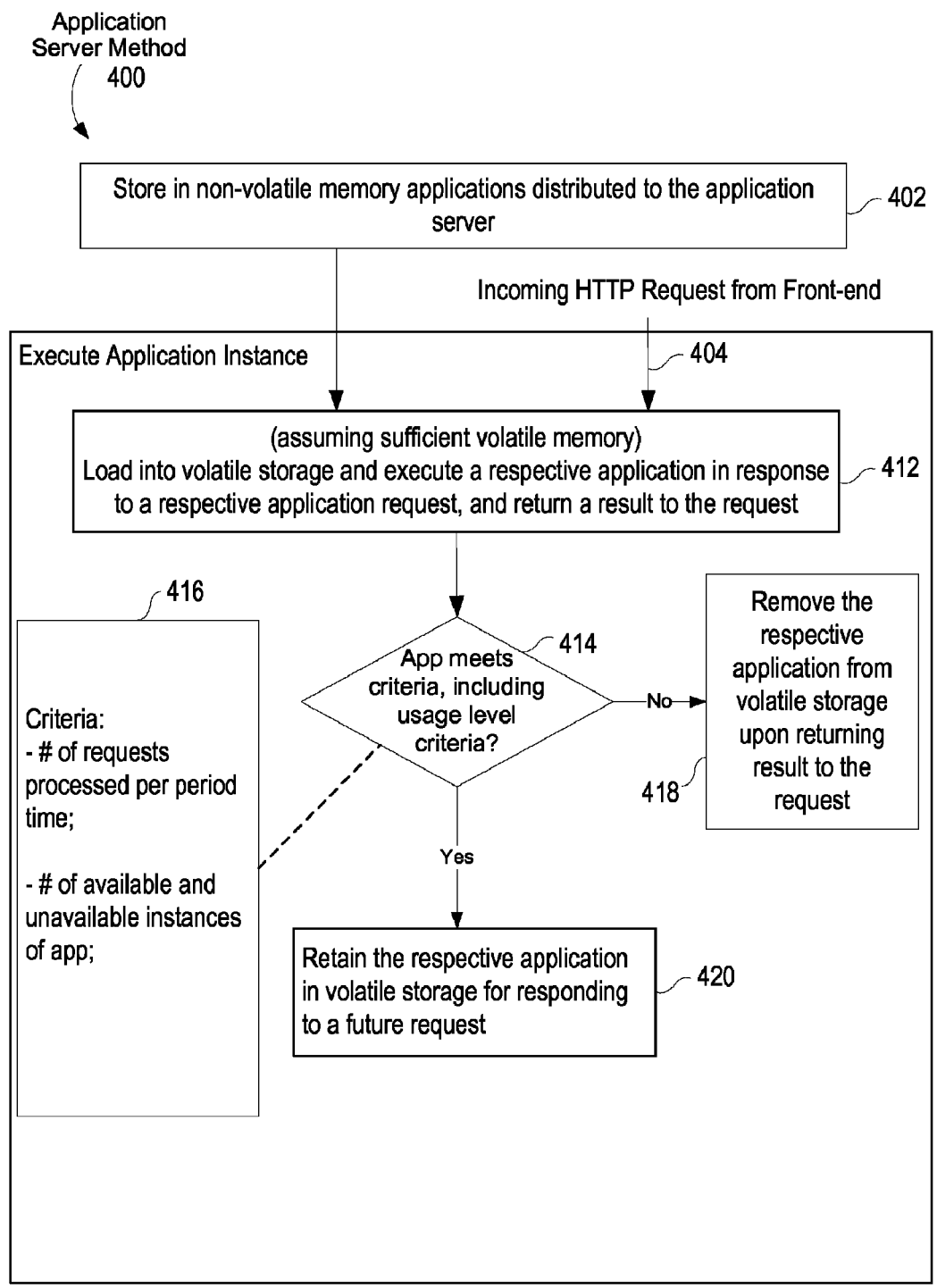
FIG. 4A is a flow diagram illustrating a method performed by an application server according to certain embodiments of the invention.

FIG. 4A is a flow diagram illustrating a method 400 performed by an application server according to certain embodiments of the invention. The applications distributed to the application server by the application master are stored in the application server's non-volatile memory (402). Assuming that there is sufficient volatile memory, in response to an application request (404) from the front-end 140, the application server loads the requested application into volatile storage, executes the requested application, and returns a result to the request (412). The application server may remove one or more applications from volatile memory before performing operation 412 when there is insufficient volatile memory to process the request. Alternatively, the application server may automatically remove applications from volatile memory when the amount of available volatile storage is below a predefined threshold.

In some embodiments, after returning the result to the request, the application server can either remove the respective application from volatile storage (418), or retain the respective application in volatile storage (420) for responding to future requests, by determining whether predefined criteria has been met (414). In some embodiments, the predefined criteria (416) used by the application server include usage level criteria, which may include the number of requests for the application processed per period of time. The predefined criteria may also include caching criteria, which may include the number of respective application instances in volatile storage available for handling new requests, and the number of respective application instances handling active requests and therefore not available for handling new requests. Cached application instances are discussed in more detail below with reference to FIG. 4B. The predefined criteria may also include error criteria, which may be based on the number of errors encountered during execution of the application, and the type of errors encountered. For example, the application server may remove the respective application from volatile storage if severe errors are encountered during N (e.g., 5, 10 or 20) consecutive executions of the application.

For applications that fail to meet the predefined criteria (414—No), the application server removes the respective applications from volatile storage upon returning the result to the request (418). In some embodiments, the application server may remove the respective applications from volatile storage according to a predefined order for removal. For example, the application server may remove the least recently used application.

In some embodiments, when determining which application instance to remove from volatile storage, the application servers may take into account the service quality levels of the applications for which instances are stored in volatile memory. The service quality level of each application may be based on the level of service requested, or paid for. Various forms of preferences (for retention of application instances in volatile memory) may be given to applications with high service quality levels, compared to applications with lower service quality levels. For example, lower service quality level application instances may be evicted before higher service quality level application instances whenever a predefined condition is true. The predefined condition may relate to numbers or ratios of lower and higher service quality level application instances loaded in volatile memory. Alternately, scores may be computed to determine which application instances to unload from volatile memory, and computation of the scores may take into account the service quality levels of the applications.

For applications that meet the predefined criteria (414—Yes), the application server retains the respective applications in volatile storage for responding to future requests for the application (420). In some embodiments, the application server retains more than one application instance of the respective application in volatile storage in accordance with predefined caching criteria. In some embodiments, the application server limits the number of application instances in volatile storage. For example, the application server may limit the total number of application instances in volatile memory to ensure that there is sufficient volatile memory for other processing tasks. Alternatively, the application server may limit the number of instances of a respective application to ensure that other requested applications have access to sufficient volatile memory to service their requests.

Figure 4B:
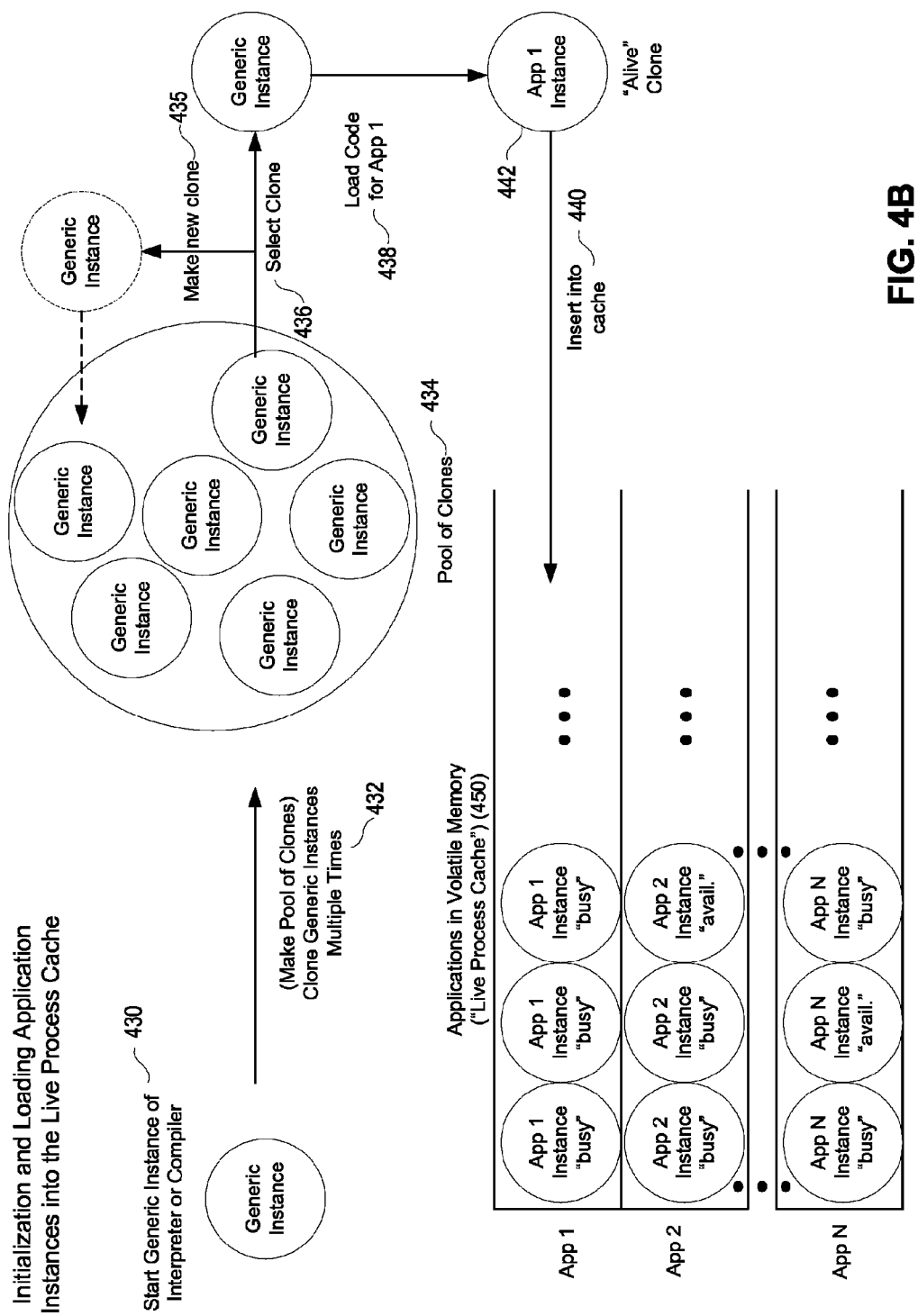
FIG. 4B is a conceptual diagram of a process for managing application instances in volatile memory by the application server in accordance with some embodiments of the invention.

FIG. 4B is a conceptual diagram of a process for managing application instances in volatile memory by the application server in accordance with some embodiments of the invention. The application servers actively manage application instances in volatile memory through a live process cache 450. The application server first initiates a generic application instance 430, sometimes called a "generic instance." The generic instance is "cloned" multiple times (432) resulting in a "pool of clones" (434) of the generic instance. When a request for an application is received, the application server removes (436) a generic instance clone from the "pool of clones" and loads the code for the requested application (438) into the generic instance clone to produce an application instance 442. In some embodiments, when a clone is removed from the "pool of clones," a request is issued to create a new generic instance clone to replace the one selected (435). The code for the requested application may be associated with any of a variety of programming languages including but not limited to: Java, Perl, Python, or C. In some embodiments, the application is executed using an interpreter, while in other embodiments the application code is compiled and linked (as needed) with any other code (e.g., library procedures) to produce code that is ready for execution by the application server, in the context of the application server's operating system.

In FIG. 4B, the application server receives a request for "App 1." The application server, in response, loads the code for "App 1" into a generic instance (438). The "App 1" instance may be referred to as "live" or "alive" since it contains code that is readily executable by the application server. The App 1 instance is loaded into a cache (e.g., "Live Process Cache") 450. The cache may contain other instances of App 1 as well as instances of other requested applications. These application instances in the Live Process Cache 450 are either "busy" or "available," although other transitional states could be used in addition in other embodiments. A "busy" application instance is one that is processing a current request, and therefore cannot process another incoming request until it finishes processing the current request. The "available" instances are ready to process any received request for the respective application.

Figure 4C:
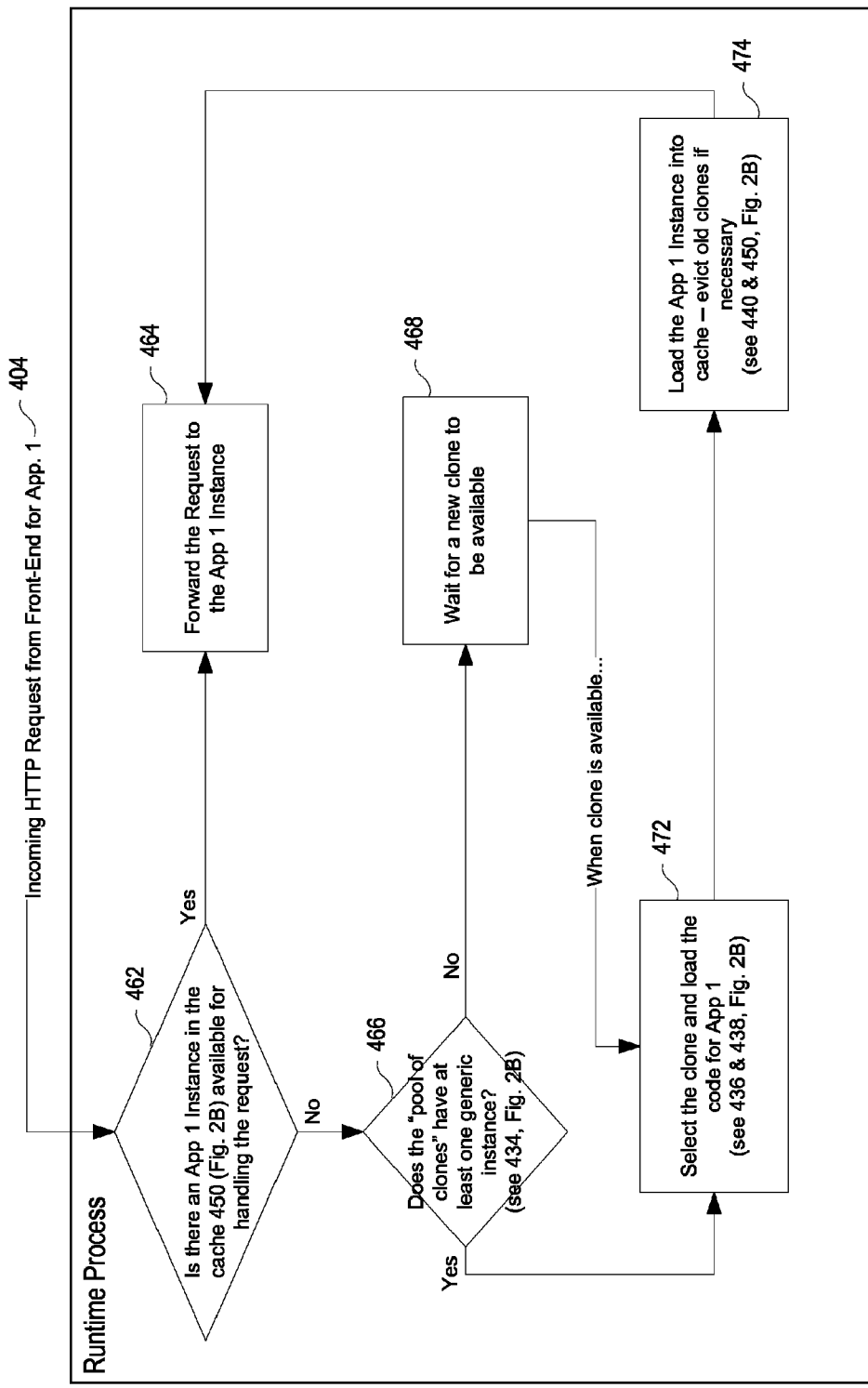
FIG. 4C is a flow diagram illustrating an example of a runtime process performed by an application server in accordance with some embodiments of the invention.

FIG. 4C is a flow diagram illustrating an example of a runtime process at the application server in accordance with some embodiments. For the purposes of this example, it may be assumed that the application server has sufficient resources available to handle an incoming request to execute an application. Upon receiving a request 404 from the front-end for "App 1," the application server queries the cache 450 (FIG. 4B) for an available "App 1" instance for handling the request. If the cache returns an available "App 1" instance (462—Yes), the request is forwarded to the returned instance for processing (464). If the cache does not return an available "App 1" instance (462—No), the application server determines if the "pool of clones" (434, FIG. 4B) has at least one generic instance (466). If there are generic instances available (466—Yes), a generic instance clone is selected from the "pool of clones" (472). The App 1 code is loaded onto the selected generic instance (472), and the App 1 instance is loaded into the live process cache (474). Other application instances (e.g., the least recently used instance) are removed from the cache if necessary (e.g., to make room for new application instances). If there are no generic instances available (466—No), the process waits for a generic instance clone to be available (468) before performing operations 472 and 474.

Figure 5:
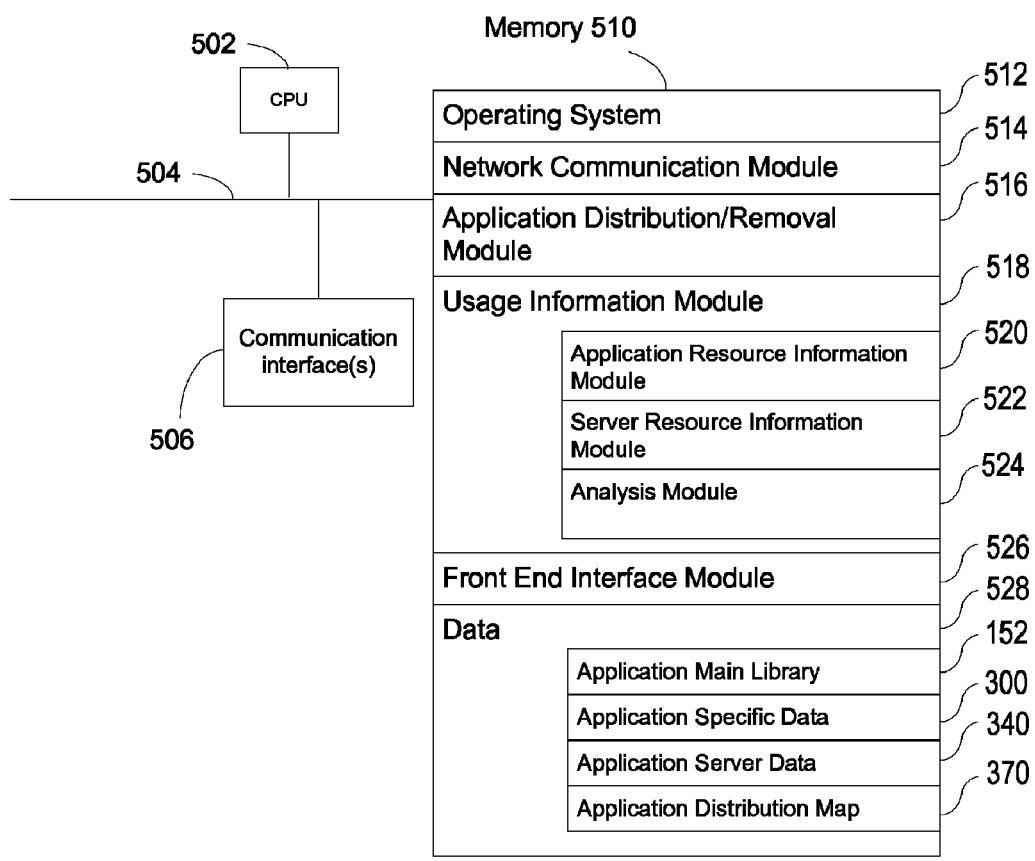
FIG. 5 is a block diagram of an application master, which may implemented using one or more servers in accordance with some embodiments of the invention.

FIG. 5 is a block diagram of an application master 500, which may implemented using one or more servers. For convenience, the application master 500 is herein described as implemented using a single server or other computer. The application master 500 generally includes one or more processing units (CPU's) 502, one or more network or other communications interfaces 506, memory 510, and one or more communication buses 504 for interconnecting these components. The communication buses 504 may include circuitry (sometimes called a chipset) that interconnects and controls communications between system components. Memory 510 may include high speed random access memory and may also include non-volatile memory, such as one or more magnetic disk storage devices. Memory 510 may include mass storage (e.g., data store 170, FIG. 1) that is remotely located from the central processing unit(s) 502. Memory 510, or alternately the non-volatile memory device(s) within memory 510, comprises a computer readable storage medium. In some embodiments, memory 510 stores the following programs, modules and data structures, or a subset thereof:

- an operating system 512 that includes procedures for handling various basic system services and for performing hardware dependent tasks;
- a network communication module 514 that is used for connecting the application master 500 to other computers via the one or more communication network interfaces 506 (wired or wireless) and one or more communication networks, such as the Internet, other wide area networks, local area networks, metropolitan area networks, and the like;
- an application distribution/removal module 516 that is used for distributing applications from the main library 152 to the application servers 160 for storage in non-volatile storage of the application servers; the application distribution/removal module 516 also includes instructions for removing previously distributed applications from the non-volatile storage of respective application servers in accordance with usage information, as discussed above with reference to FIG. 2B;
- a usage information module 518 that includes procedures for monitoring the application servers to generate usage information;
- a front end interface module 526 that is used for interfacing with the front end servers 140 (FIG. 1); and
- data 528, which includes the main library data 152, application specific data 300, application server data 340, and the application distribution map 370.

The procedures in the usage information module 518 include an Application Resource Information Module 520 to retrieve application resource information (e.g., application specific data stored in data structure 300, FIG. 3A), and a server resource information module 522 to retrieve resource information concerning the application servers (e.g., application server data stored in data structure 340, FIG. 3B). In some embodiments, the usage information module 518 also includes one or more procedures 524 (Analysis Module) for analyzing the retrieved application resource and server resource information to generate usage statistics.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Figure 6:
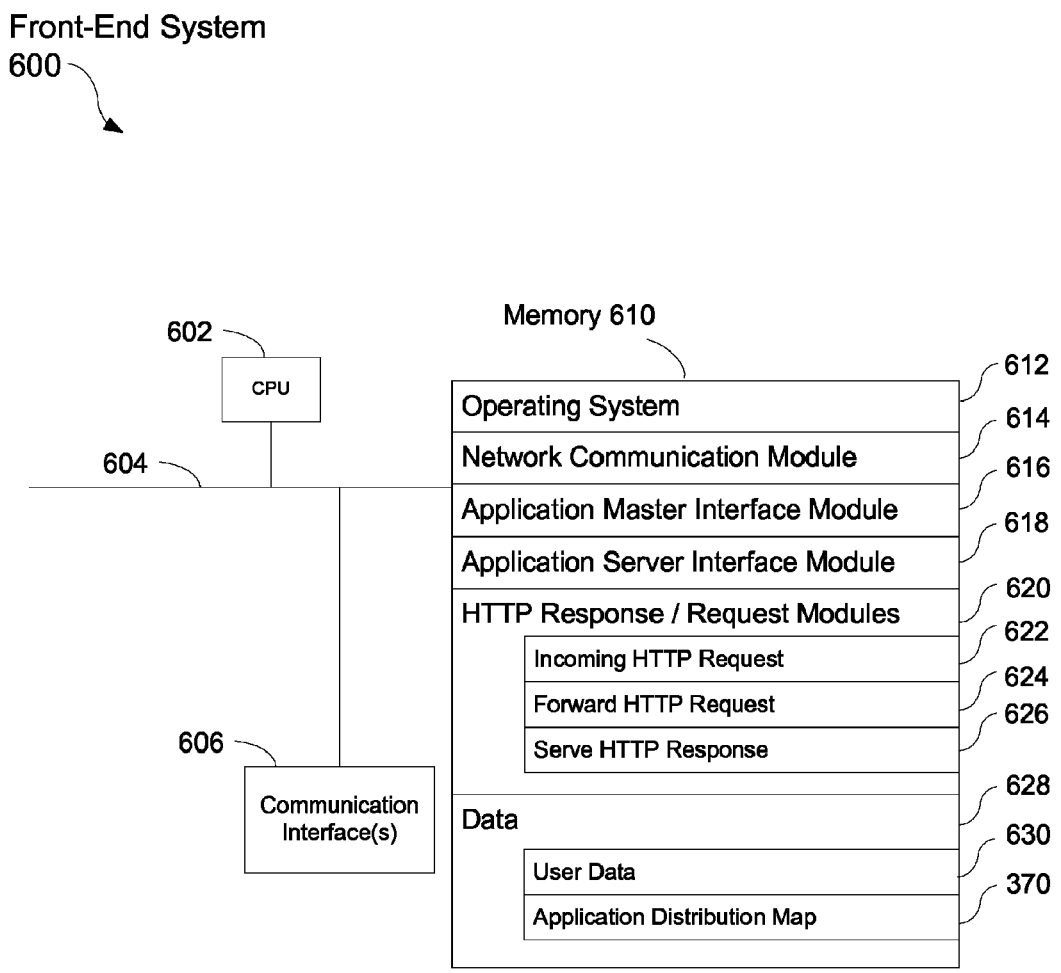
FIG. 6 is a block diagram of a front-end system, which may implemented using one or more servers in accordance with some embodiments of the invention.

FIG. 6 is a block diagram of a front-end system 600, which may implemented using one or more servers. For convenience, the front-end system 600 is herein described as implemented using a single server or other computer. The front-end system 600 generally includes one or more processing units (CPU's) 602, one or more network or other communications interfaces 606, memory 610, and one or more communication buses 604 for interconnecting these components. The communication buses 604 may include circuitry (sometimes called a chipset) that interconnects and controls communications between system components. Memory 610 may include high speed random access memory and may also include non-volatile memory, such as one or more magnetic disk storage devices. Memory 610 may include mass storage (e.g., data store 170, FIG. 1) that is remotely located from the central processing unit(s) 602. Memory 610, or alternately the non-volatile memory device(s) within memory 610, comprises a computer readable storage medium. In some embodiments, memory 610 stores the following programs, modules and data structures, or a subset thereof:

- an operating system 612 that includes procedures for handling various basic system services and for performing hardware dependent tasks;
- a network communication module 614 that is used for connecting the front-end 600 to other computers via the one or more communication network interfaces 606 (wired or wireless) and one or more communication networks, such as the Internet, other wide area networks, local area networks, metropolitan area networks, and the like;
- an application master interface module 616 that is used for interfacing with the application master 150 (FIG. 1);
- an application server interface module 618 that is used for interfacing with the application servers 160 (FIG. 1);
- response and request modules 620 for handling incoming client 102 requests for applications. In some embodiments, the response and request modules 620 include procedures for receiving incoming requests (Incoming HTTP Request) 622 and for forwarding the HTTP Request to application servers 160 (FIG. 1) that host the requested application (Forward HTTP Request) 624. The response and request modules 620 may also include procedures for serving responses from the application servers 160 to the clients 102 (Serve HTTP Response) 626.
- data 628 which includes user data 630 and the application distribution map 370. In some embodiments, the user data 630 include client-specific information passed to the front-end 140 by the client 102 (e.g., parameters embedded in the HTTP request). The application distribution map 370 includes information used by the front-end to route application processing requests to application servers. This is described in more detail above with reference to FIG. 3C.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Figure 7:
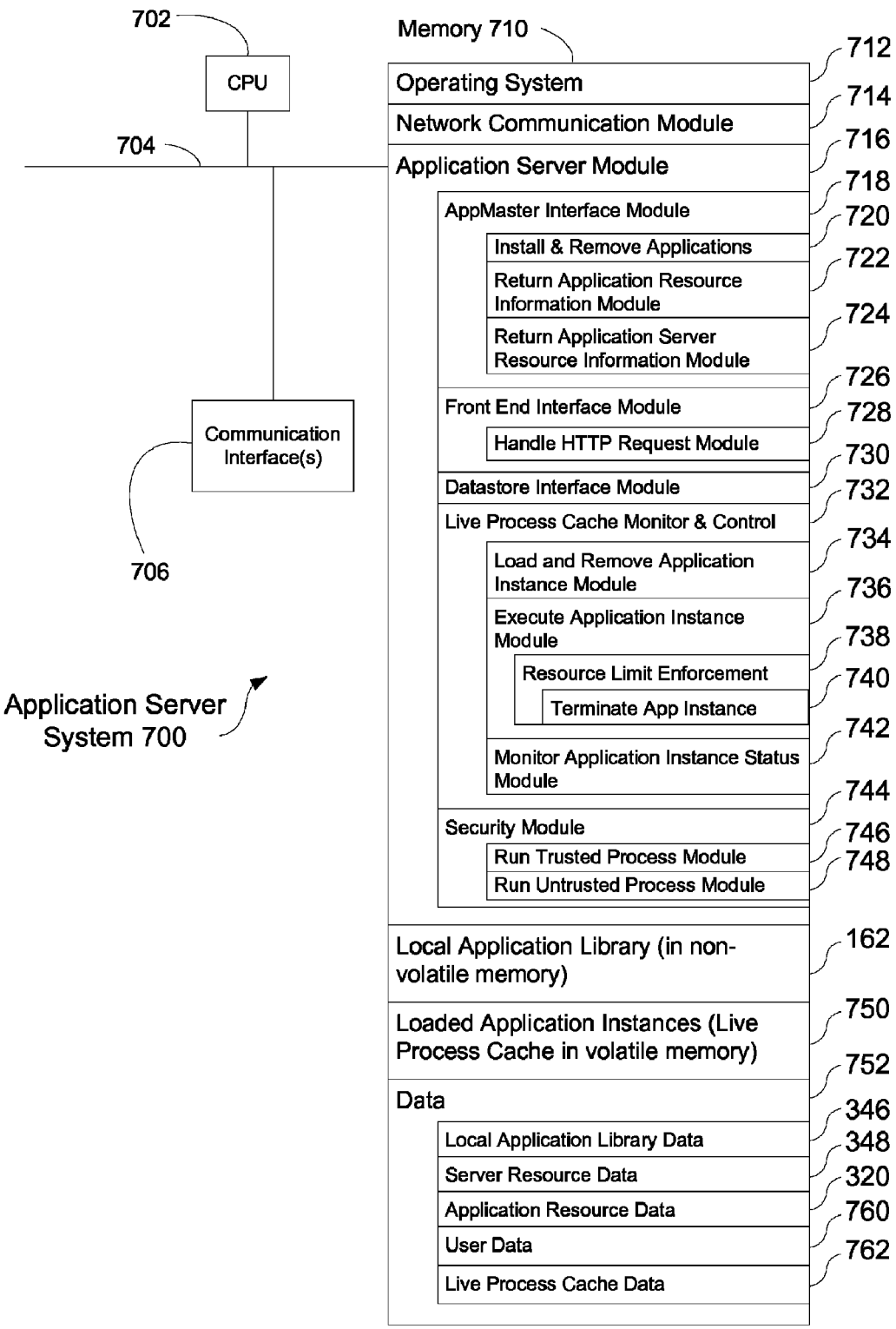
FIG. 7 is a block diagram of an application server in accordance with some embodiments of the invention.

FIG. 7 is a block diagram of an application server 700, which may implemented using one or more servers. For convenience, the application server 700 is herein described as implemented using a single server or other computer. The application server 700 generally includes one or more processing units (CPU's) 702, one or more network or other communications interfaces 706, memory 710, and one or more communication buses 704 for interconnecting these components. The communication buses 704 may include circuitry (sometimes called a chipset) that interconnects and controls communications between system components. Memory 710 may include high speed random access memory and may also include non-volatile memory, such as one or more magnetic disk storage devices. Memory 710 may include mass storage (e.g., data store 170, FIG. 1) that is remotely located from the central processing unit(s) 702. Memory 710, or alternately the non-volatile memory device(s) within memory 710, comprises a computer readable storage medium. In some embodiments, memory 710 stores the following programs, modules and data structures, or a subset thereof:

- an operating system 712 that includes procedures for handling various basic system services and for performing hardware dependent tasks;
- a network communication module 714 that is used for connecting the application server 700 to other computers via the one or more communication network interfaces 706 (wired or wireless) and one or more communication networks, such as the Internet, other wide area networks, local area networks, metropolitan area networks, and the like;
- an application server module 716 that is used for processing application requests. In some embodiments, the application server module 716 includes an application master interface module 718 for interfacing with the application master 150 (FIG. 1), a front-end interface module for interfacing with the front-end 140, a data store interface module for interfacing with the data store 170, a live process cache monitor and control 732 for managing application instances in the live process cache 450 (FIG. 4B). The application server module 716 may also store a security module 744 for executing untrusted processes (Run Untrusted Process Module) 748 and trusted processes (Run Trusted Process Module) 746. Some of the procedures included in the application server module 716 are further described below.
- a local application library 162, for storing the applications distributed to the application server by the application master 150;
- application instances in volatile memory 750 (e.g., in a live process cache 450, FIG. 4B) for servicing application requests. In some embodiments, there is at least one application instance for an application in volatile memory.
- data 752, which includes local application library data 346, described above with reference to FIG. 3B, server resource data 348, described above with reference to FIG. 3B, and application resource data 320, described above with reference to FIG. 3A. When needed, data 752 includes user data 760, which may include data received from a requesting user (e.g., user name, passwords, user preferences, profiling information) and/or data produced or retrieved for the requesting user by the application server. In addition, data 752 may include live process cache data 762, described below with reference to FIG. 8.

In some embodiments, both application resource data 320 and server resource data 348 are sent by the application server to the application master 150, which allows the application master 150 to monitor the application servers 160 and generate usage statistics (e.g., see FIG. 2B).

In some embodiments, the application master interface module 718 includes procedures 720 for adding or removing applications from the non-volatile storage of the application server (Install & Remove Applications). The application master interface module 718 may also include procedures 722, 724 for sending usage information on application resources (Return Application Resource Information Module) and server resources (Return Application Server Resource Information Module) to the application master. In some embodiments, the front end interface module 726 includes procedures for handling application requests (Handle HTTP Request Module) 728 forwarded from the front end 140.

In some embodiments, the application server module 716 also includes procedures (Live Process Cache Monitor & Control) 732 for monitoring and controlling the live process cache. These procedures include procedures (Load and Remove Application Instance Module) 734 for loading and removing application instances into the live process cache in accordance with application usage and available volatile memory. There are also procedures (Execute Application Instance Module) 736 for executing application instances when processing application requests.

The Execute Application Instance Module 736 may also include procedures (Resource Limit Enforcement) 738 for limiting resource consumption of a particular application. For example, an application that consumes more resources than a limit or threshold will be terminated (Terminate App Instance) 740. The resource limit may be a predefined amount or the threshold may vary depending on factors such as the number of requests for the application. For example, applications that receive higher numbers of requests may have a higher threshold before the application instance is terminated. Alternatively, the threshold may also depend on the amount of processing resources (e.g., one or more of: CPU time, "wall clock" time (i.e., total elapsed real time), memory, communication bandwidth, and number of system function calls made) consumed by the application. The threshold(s) may be applied per execution of an application, or to a running average of resources used over multiple executions of the application. An application instance that consumes resources above a corresponding threshold may be terminated.

The live process cache monitor & control module 732 may also include procedures for monitoring the status of application instances (Monitor Application Instance Status Module) 742. For example, the status of the application instances may be "busy," "available," or any transitional state in between (see FIG. 4B).

Figure 8:
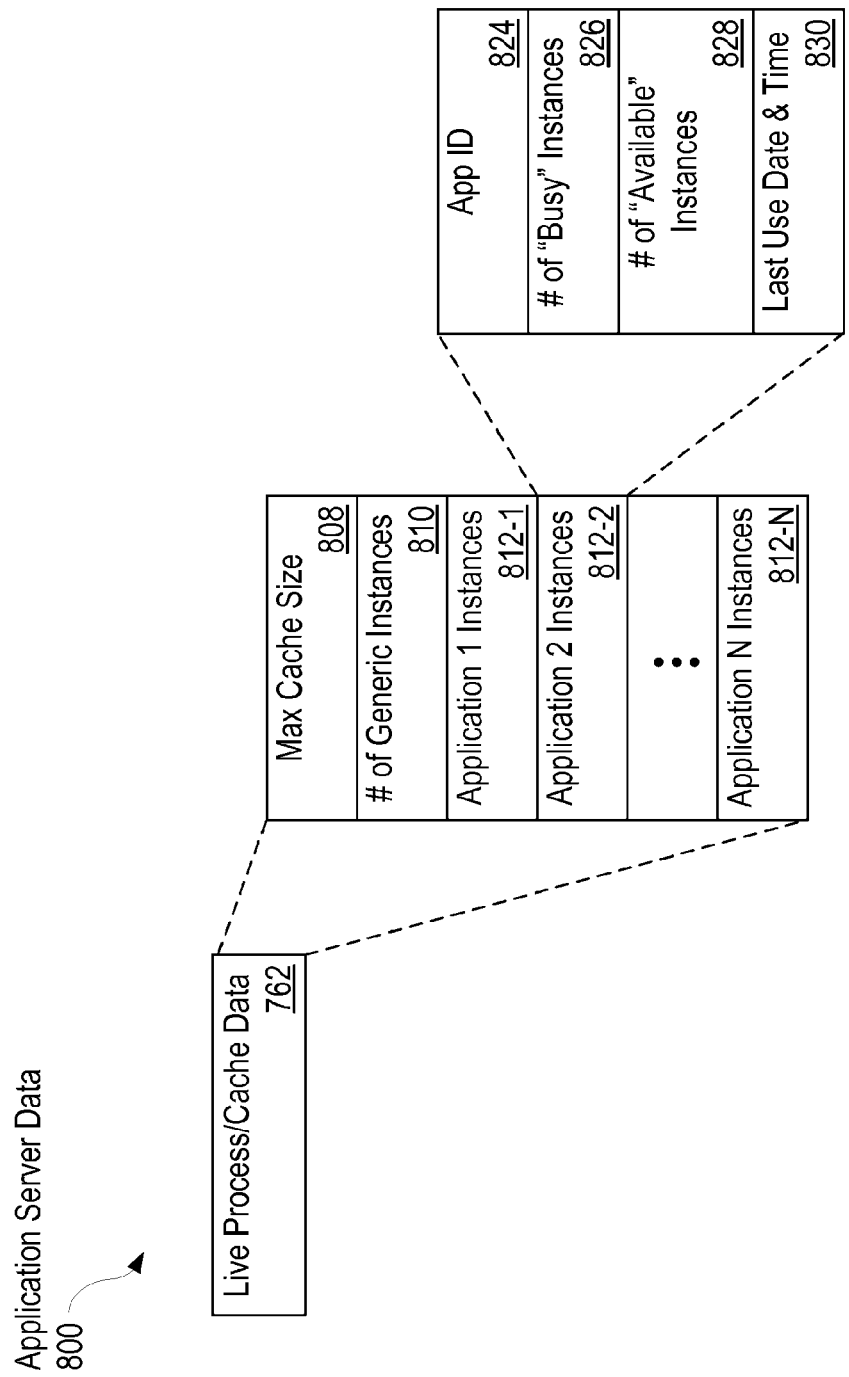
FIG. 8 is a block diagram illustrating a data structure for use by the application server for storing information relating to application instances in volatile memory in accordance with some embodiments of the invention.

FIG. 8 is a block diagram of a table or other data structure (live process ca cache data) 762 storing information relating to application instances stored in volatile memory (e.g., Live Process Cache 450, FIG. 4B), for processing application requests. As shown in FIG. 8, live process cache data 762 includes the following items of information, or a subset or superset thereof:
  cache size information 808, which may be represented (for example) in terms of memory capacity (e.g., a number of gigabytes), or a maximum number of application instances that can be stored in the live process cache;
  the number of generic instances 810 currently available for allocation; and
  information 812 about each of the applications, or application instances, currently in the live process cache 450. For example, information 812 may indicate for each application having at least one instance in the live process cache, the identity 824 of the application, the number 826 of busy instances of the application, the number 828 of available instances of the application, and last use information 830 (e.g., the date/time of last use of the application, or other information sufficient to enable implementation of a cache eviction policy).

Each of the above identified elements in FIGS. 7 and 8 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 710 may store a subset of the modules and data structures identified above. Furthermore, memory 710 may store additional modules and data structures not described above.

Although FIGS. 5, 6 and 7 show an application master, a front end server and an application server, these figures are intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIG. 5, 6 or 7 could be implemented on single servers and single items could be implemented by one or more servers. The actual number of servers used to implement each such subsystem and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An application server, for use in a system having an application master and a plurality of application servers, the application server comprising:
  one or more processors;
  memory storing one or more programs to be executed by the one or more processors, the memory including volatile storage and non-volatile storage, the one of more programs including instructions for:
    storing in the non-volatile storage a plurality of applications distributed to the application server by the application master;
    loading into volatile storage and executing a respective application in response to a received request, and returning a result to the request; and
    conditionally retaining the respective application in volatile storage, for responding to a future request, when criteria, including at least predefined usage level criteria, are met by the respective application, and otherwise removing the respective application from volatile storage upon returning the result to the request.

2. The system of claim 1, wherein the application server includes instructions for retaining a plurality of respective applications in volatile storage that meet the predefined usage level criteria.

3. The system of claim 2, wherein the predefined usage level criteria are based on a number of requests processed by a respective application in a predefined period of time.

4. The system of claim 2, wherein the application server includes instructions for retaining a number, greater than one, of instances of a respective application in volatile storage in accordance with predefined caching criteria, wherein the predefined caching criteria include:
the number of instances of the respective application in volatile storage available for handling new requests; and
the number of instances of the respective application handling active requests and not available for handling new requests.

5. The system of claim 2, wherein the application server includes instructions for limiting the number of applications in volatile storage.

6. The system of claim 1, wherein the application server includes instructions for removing an instance of the respective application from volatile storage according to the predefined usage level criteria and a predefined order for removal of application instances from volatile storage.

7. The system of claim 6, wherein the predefined usage level criteria are based on a number of requests processed by a respective application in a predefined period of time.

8. The system of claim 6, wherein the predefined order for removal of application instances is to remove first a least-recently-used application instance.

9. The system of claim 6, wherein the predefined order for removal of application instances from volatile storage is based at least in part on one or more service quality levels associated with the applications for which application instances are loaded in volatile storage.

10. The system of claim 1, wherein the application server further includes instructions for removing the respective application from volatile storage according to error criteria, wherein the error criteria include:
number of errors encountered when executing the respective application in response to the receive request; and
type of error encountered.

11. The system of claim 1, wherein the predefined usage level criteria are based on a number of requests processed by a respective application in a predefined period of time.

12. The system of claim 1, wherein each application of the plurality of applications is responsive to http requests.

13. A method of operating an application server in a system having a plurality of application servers, the method comprising:
storing in non-volatile storage of the application server a plurality of applications distributed to the application server by an application master;
receiving a request from a source external to the application server;
loading into volatile storage and executing a respective application in response to the received request, and returning a result to the request; and
conditionally retaining the respective application in the volatile storage, for responding to a future request, when criteria, including at least predefined usage level criteria, are met by the respective application, and otherwise removing the respective application from volatile storage upon returning the result to the request.

14. The method of claim 13, further including retaining a plurality of respective applications in volatile storage that meet the predefined usage level criteria.

15. The method of claim 14, wherein the predefined usage level criteria are based on a number of requests processed by a respective application in a predefined period of time.

16. The method of claim 14, further including retaining a number, greater than one, of instances of a respective application in volatile storage in accordance with predefined caching criteria, wherein the predefined caching criteria include:
the number of instances of the respective application in volatile storage available for handling new requests; and
the number of instances of the respective application handling active requests and not available for handling new requests.

17. The method of claim 14, further including limiting the number of applications in volatile storage.

18. The method of claim 13, further including removing an instance of the respective application from volatile storage according to the predefined usage level criteria and a predefined order for removal of application instances from volatile storage.

19. The method of claim 18, wherein the predefined usage level criteria are based on a number of requests processed by a respective application in a predefined period of time.

20. The method of claim 18, wherein the predefined order for removal of application instances is to remove first a least-recently-used application instance.

21. The method of claim 18, wherein the predefined order for removal of application instances from volatile storage is based at least in part on one or more service quality levels associated with the applications for which application instances are loaded in volatile storage.

22. The method of claim 13, further including removing the respective application from volatile storage according to error criteria, wherein the error criteria include:
number of errors encountered when executing the respective application in response to the receive request; and
type of error encountered.

23. The method of claim 13, wherein the predefined usage level criteria are based on a number of requests processed by a respective application in a predefined period of time.

24. The method of claim 13, wherein each application of the plurality of applications is responsive to http requests.

25. An application execution system, comprising:
a plurality of application servers, each of the application servers including non-volatile storage for storing a plurality of applications; and volatile storage and computational resources for executing applications in response to requests received by the application execution system;
an application master that stores a plurality of applications in a library for distribution among the application servers, the application master including instructions for:
distributing applications from the library to the application servers for storage in the non-volatile storage of the application servers;
monitoring the application servers to generate usage information for each of the applications in the library for a predefined period of time ending at a current time; and
removing previously distributed applications from the non-volatile storage of respective application servers in accordance with the usage information;
wherein the distributing includes distributing each application to a respective number of the application servers determined by the application master in accordance with the usage information;
each application server of the plurality of application servers including instructions for:
storing in non-volatile storage the applications distributed to the application server;
loading a respective application into volatile storage, executing the respective application in response to a received request, and returning a result to the request; and
conditionally retaining the respective application in volatile storage, for responding to a future request, when criteria, including at least predefined usage level criteria, are met by the respective application, and otherwise removing the respective application from volatile storage upon returning the result to the request.

26. The system of claim 25 wherein the usage information used by the application master includes:
   CPU load of each application server;
   CPU usage of each application on a respective application server; and
   amount of non-volatile memory available on each application server.

27. The system of claim 25 wherein the application master distributes from the library each application in the library to at least three application servers of the plurality of application servers.

28. The system of claim 25 wherein the removing of previously distributed applications from the non-volatile storage of the application servers and the distributing of applications from the library to the application servers are rate-limited with respect to how many applications are removed and distributed per predefined period of time.

29. The system of claim 25 wherein the application master manages the load on a respective application server, in accordance with predefined load requirements, by distributing applications to and removing applications from the non-volatile storage of the respective application server.

30. The system of claim 25 wherein the application master generates distribution data identifying which of the applications are present in the non-volatile storage of each of the application servers; and wherein the system includes one or more front end servers that route requests to the application servers in accordance with the distribution data.

31. The system of claim 30, wherein the one or more front end servers route requests to the application servers based on load data collected from each of the application servers; and wherein the load data includes number of outstanding requests sent to each application server.

32. The system of claim 25 wherein each application of the plurality of applications is responsive to http requests.

33. A method of operating a plurality of application servers and an application master in an application execution system, the method comprising:
   at the application master:
      storing a plurality of applications in a library for distribution among the application servers;
      distributing applications from the library to the application servers for storage in the non-volatile storage of the application servers;
      monitoring the application servers to generate usage information for each of the applications in the library for a predefined period of time ending at a current time; and
      removing previously distributed applications from the non-volatile storage of respective application servers in accordance with the usage information;
      wherein the distributing includes distributing each application to a respective number of the application servers determined by the application master in accordance with the usage information; and
   at each application server of the plurality of application servers:
      storing in non-volatile storage the applications distributed to the application server;
      loading a respective application into volatile storage, executing the respective application in response to a received request, and returning a result to the request; and
      conditionally retaining the respective application in volatile storage, for responding to a future request, when criteria, including at least predefined usage level criteria, are met by the respective application, and otherwise removing the respective application from volatile storage upon returning the result to the request.

34. The method of claim 33, wherein the usage information used by the application master includes:
   CPU load of each application server;
   CPU usage of each application on a respective application server; and
   amount of non-volatile memory available on each application server.

35. The method of claim 33, wherein the application master distributes from the library each application in the library to at least three application servers of the plurality of application servers.

36. The method of claim 33, wherein the removing of previously distributed applications from the non-volatile storage of the application servers and the distributing of applications from the library to the application servers are rate-limited with respect to how many applications are removed and distributed per predefined period of time.

37. The method of claim 33, wherein the application master manages a load on a respective application server, in accordance with predefined load requirements, by distributing applications to and removing applications from the non-volatile storage of the respective application server.

38. The method of claim 33, wherein the application master generates distribution data identifying which of the applications are present in the non-volatile storage of each of the application servers; and wherein the application execution system includes one or more front end servers that route requests to the application servers in accordance with the distribution data.

39. The method of claim 38, wherein the one or more front end servers route requests to the application servers based on load data collected from each of the application servers; and wherein the load data includes number of outstanding requests sent to each application server.

40. The method of claim 33, wherein each application of the plurality of applications is responsive to http requests.

* * * * *